US012528398B2

(12) United States Patent
Stephan

(10) Patent No.: US 12,528,398 B2
(45) Date of Patent: Jan. 20, 2026

(54) CENTER CONSOLE FOR A VEHICLE

(71) Applicant: Ford Global Technologies, LLC, Dearborn, MI (US)

(72) Inventor: Joerg Stephan, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 337 days.

(21) Appl. No.: 18/239,464

(22) Filed: Aug. 29, 2023

(65) Prior Publication Data
US 2024/0101012 A1 Mar. 28, 2024

(30) Foreign Application Priority Data

Sep. 28, 2022 (DE) .......................... 102022124915.8

(51) Int. Cl.
*B60N 3/10* (2006.01)
*B60N 2/75* (2018.01)
(52) U.S. Cl.
CPC ............. *B60N 3/101* (2013.01); *B60N 2/793* (2018.02)
(58) Field of Classification Search
CPC .................................. B60N 3/101; B60N 2/793
See application file for complete search history.

(56) References Cited

U.S. PATENT DOCUMENTS

| 7,104,580 | B2 | 9/2006 | Clark et al. | |
|---|---|---|---|---|
| 8,540,297 | B2 * | 9/2013 | Browne | B60N 2/773 |
| | | | | 296/37.8 |
| 10,709,249 | B2 | 7/2020 | Liu et al. | |
| 2010/0090491 | A1 | 4/2010 | Hipshier et al. | |
| 2010/0314896 | A1 | 12/2010 | Skibinski et al. | |
| 2018/0072201 | A1 | 3/2018 | Wittorf | |
| 2024/0101034 | A1 * | 3/2024 | Stephan | B60R 11/0229 |
| 2024/0101035 | A1 * | 3/2024 | Stephan | B60R 7/04 |
| 2024/0101037 | A1 * | 3/2024 | Stephan | B60R 16/03 |

FOREIGN PATENT DOCUMENTS

| CN | 213705335 | U | 7/2021 | | |
|---|---|---|---|---|---|
| DE | 10321837 | B4 | 3/2014 | | |
| DE | 102017206938 | A1 | 10/2018 | | |
| DE | 102019212293 | A1 * | 3/2021 | ............... | B60R 7/04 |
| DE | 102020214856 | A1 | 6/2022 | | |
| DE | 102022106537 | B3 * | 5/2023 | ............... | B60R 7/04 |
| DE | 102023126894 | A1 * | 4/2025 | ......... | B60R 11/0235 |

* cited by examiner

*Primary Examiner* — Faye M Fleming
(74) *Attorney, Agent, or Firm* — Vichit Chea; Price Heneveld LLP

(57) ABSTRACT

A center console for a vehicle, having at least one storage trough which extends over at least a predominant part of a length of the center console. In order to provide a center console that is of simplified construction and is optimized in terms of its characteristics, the center console has at least one functional unit which is connected to an elevated rearward end portion of the storage trough and which, proceeding from the rearward end portion, extends forwardly in an overhanging manner at least over a part of a length of the storage trough.

13 Claims, 2 Drawing Sheets

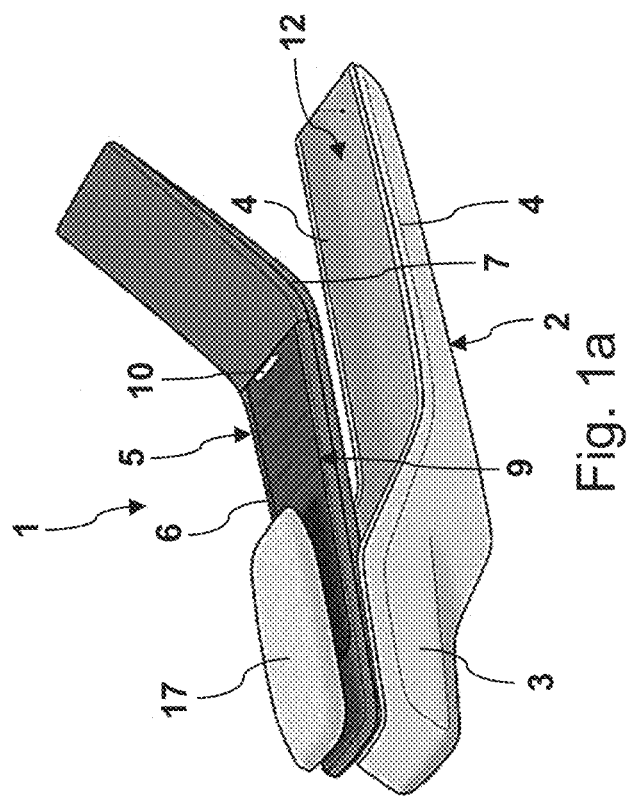
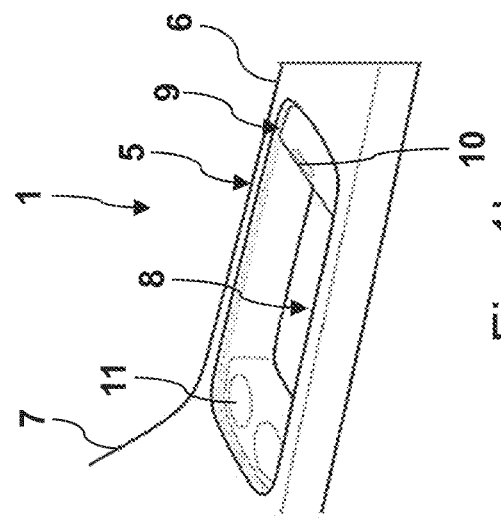
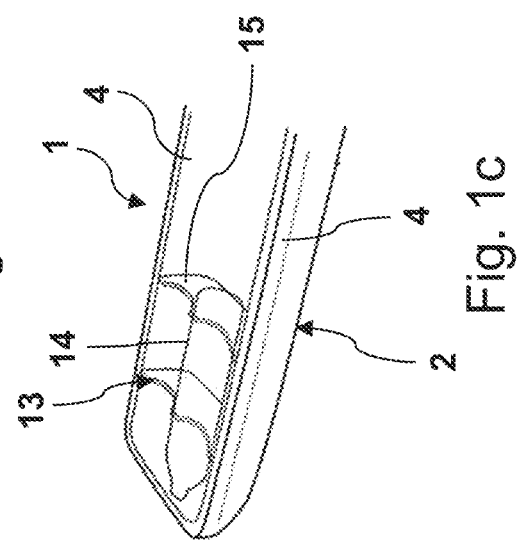
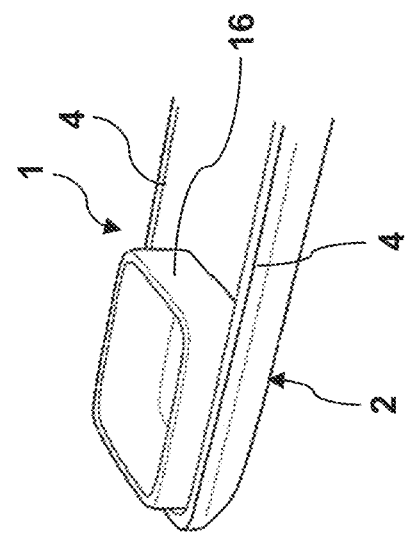
Fig. 1a
Fig. 1b
Fig. 1c
Fig. 1d

CENTER CONSOLE FOR A VEHICLE

CROSS REFERENCE TO RELATED APPLICATION(S)

This application claims foreign priority benefits under 35 U.S.C. § 119(a)-(d) to German Application No. 102022124915.8 filed Sep. 28, 2022, which is hereby incorporated by reference in its entirety.

FIELD OF THE DISCLOSURE

The present disclosure generally relates to a center console for a vehicle, and more particularly relates to a vehicle center console that has at least one storage trough which extends over at least a predominant part of a length of the center console.

BACKGROUND OF THE DISCLOSURE

Motor vehicles are commonly equipped with a center console which typically extends rearwardly from a knee region between two front footwells as far as between two front seats. Vehicle center consoles can be of different designs, and normally have at least one functional unit, for example a beverage holder or the like.

It would be desirable to provide a center console that is of simplified construction and is optimized in terms of its characteristics.

SUMMARY OF THE DISCLOSURE

According to one aspect of the present disclosure, a center console for a vehicle includes a storage trough which extends over at least a predominant part of a length of the center console, and a functional unit which is connected to an elevated rearward end portion of the storage trough and which, proceeding from the rearward end portion, extends forwardly in an overhanging manner at least over a part of a length of the storage trough.

Embodiments of the first aspect of the invention can include any one or a combination of the following features:
 the functional unit includes a vertical aperture;
 the functional unit includes a roller shutter for closing the vertical aperture;
 the functional unit includes at least one beverage holder can be closed by the roller shutter;
 the at least one beverage holder is forwardly offset in relation to the aperture;
 the functional unit has a forwardly situated, inclined display-holding unit;
 at least one bottle holder can be arranged in a storage space of the storage trough;
 at least one storage compartment is arranged to move longitudinally in the storage space of the storage trough;
 an armrest is arranged over the rearward end portion of the storage trough; and
 the rearward end portion of the functional unit is arranged between the armrest and the rearward end portion of the storage trough.

According to another aspect of the present disclosure, a center console for a vehicle includes a storage trough which extends over at least a predominant part of a length of the center console, and a functional unit which is connected to an elevated rearward end portion of the storage trough and which, proceeding from the rearward end portion, extends forwardly in an overhanging manner at least over a part of a length of the storage trough. The functional unit includes a vertical aperture, and a roller shutter for closing the vertical aperture. The center console further includes at least one beverage holder that can be closed by the roller shutter.

Embodiments of the second aspect of the invention can include any one or a combination of the following features:
 the beverage holder is forwardly offset in relation to the aperture;
 the functional unit has a forwardly situated, inclined display-holding unit;
 at least one bottle holder that can be arranged in a storage space of the storage trough;
 at least one storage compartment is arranged to move longitudinally in the storage space of the storage trough;
 an armrest is arranged over the rearward end portion of the storage trough; and
 the rearward end portion of the functional unit is arranged between the armrest and the rearward end portion of the storage trough.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 1a is a schematic and perspective illustration of an exemplary embodiment of a center console for a vehicle;

FIG. 1b is a schematic and perspective illustration of a portion of the center console shown in FIG. 1a;

FIG. 1c is a schematic and perspective illustration of a further portion of the center console shown in FIG. 1a in a first configuration;

FIG. 1d is a schematic and perspective illustration of the further portion of the center console as shown in FIG. 1c in a second configuration;

FIG. 2b is a schematic and perspective illustration of a portion of the center console shown in FIG. 2a.

DETAILED DESCRIPTION OF THE PREFERRED EMBODIMENTS

Figure 2B:
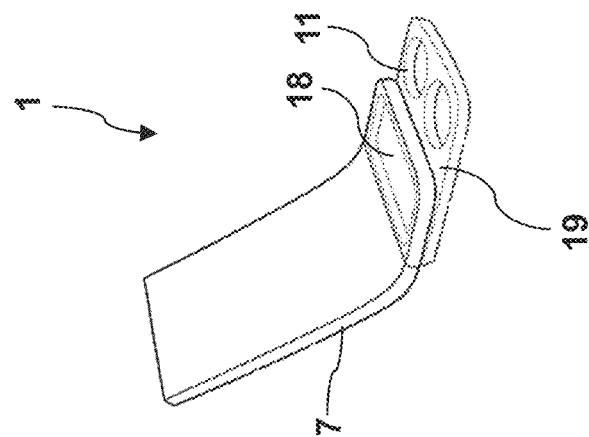

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Ordinal modifiers (i.e., "first", "second", etc.) may be used to distinguish between various structures of the disclosed transportation rack in various contexts, but that such ordinals are not necessarily intended to apply to such elements outside of the particular context in which they are used and that, in various aspects different ones of the same class of elements may be identified with the same, context-specific ordinal. In such instances, other particular designations of the elements are used to clarify the overall relationship between such elements. Ordinals are not used to designate a position of the elements, nor do they exclude additional, or intervening, non-ordered elements or signify an importance or rank of the elements within a particular class.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the terms "about", "approximately", or "substantially" are intended to mean that a value of a parameter is close to a stated value or position. However, minor differences may prevent the values or positions from being exactly as stated. Thus, unless otherwise noted, differences of up to ten percent (10%) for a given value are reasonable differences from the ideal goal of exactly as described. In many instances, a significant difference can be when the difference is greater than ten percent (10%), except as where would be generally understood otherwise by a person of ordinary skill in the art based on the context in which such term is used.

In the various figures, identical parts are denoted by the same reference designations, for which reason the parts will generally be described once.

FIG. 1a is a schematic and perspective illustration of an exemplary embodiment of a center console 1 for a vehicle, particularly a motor vehicle that is not shown. The center console 1 has a storage trough 2 which extends over at least a predominant part of a length of the center console 1. The storage trough 2 has an elevated rearward end portion 3. The storage trough 2 furthermore has two side walls 4 which extend parallel to one another so as to be laterally spaced from one another and the height of which, proceeding from the rearward end portion 3, initially significantly decreases and is then substantially constant as far as a forward end of the storage trough 2.

Furthermore, the center console 1 has a functional unit 5 which is connected to the elevated rearward end portion 3 of the storage trough 2 and which, proceeding from the rearward end portion 3, extends forwardly in an overhanging manner over a part of a length of the storage trough 2. The functional unit 5 has a horizontal and planar rearward portion 6, which is directly connected to the rearward end portion 3 of the storage trough 2, and a forwardly situated, inclined display-holding unit 7. The functional unit 5 is connected only via the rearward portion 6 to the storage trough 2, wherein the display-holding unit 7 is held, unsupported, so as to be vertically spaced apart from the storage trough 2.

A vertical aperture 8 shown in FIG. 1b, and a roller shutter 9 for closing the aperture 8, are arranged on the functional unit 5. The roller shutter 9 has horizontal slats hinged together and may be in the form of a tambour door. FIG. 1a shows the roller shutter 9 in its closed position in which it completely closes the aperture 8 and forms an additional shelf surface of the center console 1. FIG. 1b shows the roller shutter 9 in its open position in which it fully opens up the aperture 8. For the operation of the roller shutter 9, the latter has an actuating element 10 such as a motor at the forward end.

Also formed on the functional unit 5 are two laterally mutually adjacent beverage holders 11 which are shown in FIG. 1b and which can be closed by use of the roller shutter 9 as shown in FIG. 1a. The beverage holders 11 are forwardly offset in relation to the aperture 8, as shown in FIG. 1b.

In the first configuration of the center console 1 as shown in FIG. 1c, the center console has a bottle holder 13, which is arranged in a storage space 12 of the storage trough 2, for holding two mutually adjacently situated bottles 14 laying on a side in a horizontal position, with only one bottle 14 being shown arranged on the bottle holder 13 in FIG. 1c. For each bottle 14, the bottle holder 13 has two holding elements 15 which are mutually spaced from one another in a longitudinal direction of the storage trough 2 and which are formed as recesses in transverse webs. The bottle holder 13 is arranged at a forward end portion of the storage trough 2.

In the second configuration of the center console 1 shown in FIG. 1d, the center console 1 has an upwardly open storage compartment 16 which is arranged to move longitudinally in the storage space 12 of the storage trough 2. The storage compartment 16 is illustrated arranged at the forward end portion of the storage trough 2 in FIG. 1d, and can be manually moved rearward out of this position when required.

Furthermore, the center console 1 has an armrest 17 that is arranged over the rearward end portion 3 of the storage trough 2, wherein a rearward end portion of the functional unit 5 is arranged between the armrest 17 and the rearward end portion 3 of the storage trough 2.

Figure 2A:
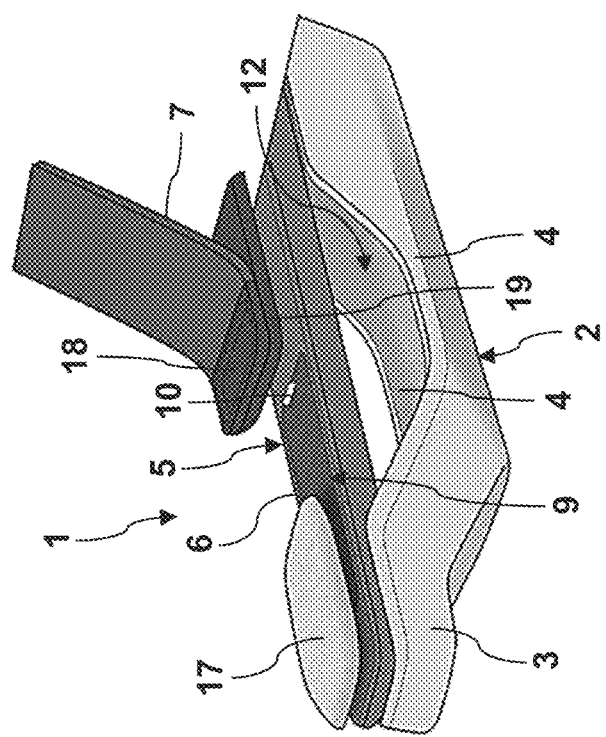
FIG. 2a is a schematic and perspective illustration of a further exemplary embodiment of a center console for a vehicle.

FIG. 2a is a schematic and perspective illustration of a further exemplary embodiment of a center console 1 for a vehicle, particularly a motor vehicle that is not shown. The center console 1 has the storage trough 2 which extends over at least a predominant part of a length of the center console 1. The storage trough 2 has the elevated rearward end portion 3. The storage trough 2 furthermore has two side walls 4 which run parallel to one another so as to be laterally spaced from one another and the height of which, proceeding from the rearward end portion 3, initially significantly decreases and then increases again in the direction of a forward end of the storage trough 2, such that the side walls 4 have a curved profile. At the forward end, the side walls 4 are of the same height as the rearward end portion 3.

Furthermore, the center console 1 has the functional unit 5 which is connected to the elevated rearward end portion 3 of the storage trough 2 and which, proceeding from the rearward end portion 3, extends forwardly in an overhanging manner over a length of the storage trough 2. The functional unit 5 is planar or has a rectilinear profile and is supported at the forward end on the side walls 4.

A vertical aperture (not shown) and the roller shutter 9 for closing the aperture 8 are arranged on the functional unit 5. The aperture 8 may be of corresponding form to that shown in FIG. 1b. FIG. 2a shows the roller shutter 9 in its closed position in which it completely closes the aperture 8 and forms an additional shelf surface of the center console 1. For the operation of the roller shutter 9, the latter has the actuating element 10 such as a motor at the forward end.

The center console 1 furthermore has the armrest 17 that is arranged over the rearward end portion 3 of the storage trough 2, wherein a rearward end portion of the functional unit 5 is arranged between the armrest 17 and the rearward end portion 3 of the storage trough 2.

The center console 1 furthermore has the rearwardly situated display-holding unit 7 which is arranged with a spacing above the functional unit 5. The display-holding unit 7 is thus supported above and on the functional unit 5, for which purpose a holding elevation may be provided. The display-holding unit 7 is adjoined rearwardly by a shelf 18. Arranged under the shelf 18 is a holding unit 19 which can be pulled out rearwardly and which has two laterally adjacent drink or beverage holders 11. The holding unit 19 is shown in its pulled-out position in FIG. 2b and in its retracted position in FIG. 2a. In the retracted position illustrated in FIG. 2a, the holding unit 19 protrudes forwardly beyond the display-holding unit 7 such that, at the rearward side, the holding unit 19 terminates flush with the display-holding unit 7. In the pulled-out state, the holding unit 19 is arranged with its beverage holders 11 above the roller shutter 9 or above the aperture 8. When the holding unit 19 has been pulled out, containers held therein can be supported on the roller shutter 9, or can project into the aperture if the roller shutter 9 has been opened. This is expedient if the containers held in the beverage holders 11 are larger than the vertical spacing between the beverage holders and the roller shutter 9. It would also be possible for a bottle standing on the floor of the storage trough 2 to extend through the aperture and the relevant opening of the beverage holders 11, such that the bottle can be held stably and taken hold of easily.

According to the disclosure, a center console is provided having at least one functional unit which is connected to an elevated rearward end portion of the storage trough and which, proceeding from the rearward end portion, extends forwardly in an overhanging manner at least over a part of a length of the storage trough.

The features and measures individually specified in the description may be combined with one another in any technically meaningful way and reveal further embodiments of the center console. The description additionally characterizes and specifies the center console, in particular in conjunction with the figures.

The center console can be formed by the storage trough and the functional unit, such that the center console can be provided with a simple but highly technical design. Here, the storage trough and the functional unit may be integrally connected to one another. Alternatively, the storage trough and the functional unit may be structural units which are produced separately from one another and which can be connected to one another by mechanical connectors and/or cohesively. In the latter case, the storage trough and the functional unit may be produced from different materials and/or in different colors.

Since the functional unit is connected to the elevated rearward end portion of the storage trough and, proceeding from the rearward end portion, extends forwardly in an overhanging manner over a part of a length of the storage trough, at least a part of a storage space of the storage trough is covered, with a vertical spacing, by the functional unit. A storage space of the center console is thus present between the functional unit and a base of the storage trough, into which storage space objects can be introduced laterally if required.

The storage trough has two side walls which extend parallel to one another and in a longitudinal direction of the center console and which may begin at the rearward end portion of the storage trough. The side walls may have a reduced height in a middle region of the storage trough. The side walls may extend with the reduced height as far as a forward end portion of the storage trough, or may have a greater height at the forward end portion of the storage trough than in the middle region of the storage trough.

The functional unit may, for example, be formed as a unit of shallow construction, the width of which may substantially correspond to the width of the storage trough, and the width of which may be considerably greater than a height of the functional unit. The functional unit may for example extend over approximately half of the length of the storage trough.

In the present description, the expressions "rearward" and "forward" relate to a vehicle in which the center console is installed, such that the center console has in particular a forward end portion and a rearward end portion.

The center console according to the disclosure may in particular be installed in a vehicle in the form of a motor vehicle, for example a passenger motor vehicle or utility motor vehicle. Such a vehicle therefore constitutes a further aspect according to the disclosure.

In one advantageous embodiment, at least one vertical aperture and at least one roller shutter for closing the aperture are arranged on the functional unit. A portion of the storage space of the storage trough that is situated under the functional unit is accessible through the open aperture. In this way, it is for example possible for a beverage bottle to be set down in the storage trough through the open aperture such that the beverage bottle is laterally surrounded in an upper region by a portion of the functional unit that surrounds or forms the aperture, in order that the beverage bottle cannot fall over. The roller shutter, when in its closed position, closes the aperture and can be used as a shelf surface of the functional unit.

In a further advantageous embodiment, at least one beverage holder that can be closed by use of the roller shutter is formed on the functional unit. By virtue of the beverage holder being covered by the roller shutter when not required, the roller shutter can be used as a shelf surface of the hand of the functional unit. The functionality of the center console can thus be varied by use of the roller shutter.

In a further advantageous embodiment, the beverage holder is forwardly offset in relation to the aperture. In this way, the beverage holder can be or is forwardly offset in relation to a front seat of the vehicle such that containers held therein can be comfortably and intuitively taken hold of by a person sitting on the front seat.

In a further advantageous embodiment, the functional unit has at least one forwardly situated, inclined display-holding unit. The functional unit or the center console is thus provided with a further function. A display, in particular a touchscreen, of an infotainment system of the vehicle can thus be held by the center console, specifically in a position that is closer to a person sitting on a front seat of the vehicle than the position of a display arranged in the conventional manner on a dashboard, whereby the operation of the display arranged on the functional unit is enhanced. The display-holding unit is inclined in the direction of the front seats or toward the rear end of the vehicle.

In a further advantageous embodiment, the center console has at least one bottle holder that can be or is arranged in a storage space of the storage trough. The bottle holder may be suitable for holding a bottle in a horizontal position. The bottle holder reliably prevents a bottle from rolling around in the storage trough. The bottle holder may also be capable of being set upright, such that the bottle held therein can project with its upper region through the above-described aperture and is supported. The bottle holder is held stably in the upright position, such that the bottle is correspondingly also held stably. The bottle holder can be returned into the horizontal position when required.

In a further advantageous embodiment, the center console has at least one storage compartment that can be arranged longitudinally movably in the storage space of the storage trough. With the storage compartment, a relatively small storage space for storing relatively small objects is made available within the storage space of the storage trough, which objects could otherwise move around in the large storage space of the storage trough. The position of the storage compartment relative to the longitudinal extent of the storage trough may be variable. In this way, a person can for example move the storage compartment rearward proceeding from a forward position in order to be able to insert an object into or remove an object from the storage compartment, and can subsequently move the storage compartment into the forward position again such that the storage space of the storage trough can be effectively utilized.

In a further advantageous embodiment, the center console has at least one armrest that is arranged over the rearward end portion of the storage trough, wherein a rearward end portion of the functional unit is arranged between the armrest and the rearward end portion of the storage trough. The armrest may be pivotable or movable between a horizontal position, in which it functions as a rest, and an opening position.

It is to be understood that variations and modifications can be made on the aforementioned structure without departing from the concepts of the present disclosure, and further it is to be understood that such concepts are intended to be covered by the following claims unless these claims by their language expressly state otherwise.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A center console for a vehicle, the center console comprising:
    a storage trough which extends over at least a predominant part of a length of the center console; and
    a functional unit which is connected to an elevated rearward end portion of the storage trough and which, proceeding from the rearward end portion, extends forwardly in an overhanging manner at least over a part of a length of the storage trough, wherein the functional unit comprises:
    a vertical aperture; and
    a roller shutter for closing the vertical aperture.

2. The center console according to claim 1, wherein the functional unit includes at least one beverage holder that can be closed by the roller shutter.

3. The center console according to claim 2, wherein the at least one beverage holder is forwardly offset in relation to the aperture.

4. The center console according to claim 1, wherein the functional unit has a forwardly situated, inclined display-holding unit.

5. The center console according to claim 1, further comprising at least one bottle holder that can be arranged in a storage space of the storage trough.

6. A center console for a vehicle, the center console comprising:
    a storage trough which extends over at least a predominant part of a length of the center console; and
    a functional unit which is connected to an elevated rearward end portion of the storage trough and which, proceeding from the rearward end portion, extends forwardly in an overhanging manner at least over a part of a length of the storage trough, wherein at least one storage compartment is arranged to move longitudinally in the storage space of the storage trough.

7. The center console according to claim 1, further comprising an armrest arranged over the rearward end portion of the storage trough, wherein the rearward end portion of the functional unit is arranged between the armrest and the rearward end portion of the storage trough.

8. A center console for a vehicle, the center console comprising:
    a storage trough which extends over at least a predominant part of a length of the center console;
    a functional unit which is connected to an elevated rearward end portion of the storage trough and which, proceeding from the rearward end portion, extends forwardly in an overhanging manner at least over a part of a length of the storage trough;
wherein the functional unit comprises:
a vertical aperture; and
a roller shutter for closing the vertical aperture; and
at least one beverage holder that can be closed by the roller shutter.

9. The center console according to claim 8, wherein the beverage holder is forwardly offset in relation to the aperture.

10. The center console according to claim 8, wherein the functional unit has a forwardly situated, inclined display-holding unit.

11. The center console according to claim 8, further comprising at least one bottle holder that can be arranged in a storage space of the storage trough.

12. The center console according to claim 8, wherein at least one storage compartment is arranged to move longitudinally in the storage space of the storage trough.

13. The center console according to claim 8, further comprising an armrest arranged over the rearward end portion of the storage trough, wherein the rearward end portion of the functional unit is arranged between the armrest and the rearward end portion of the storage trough.

* * * * *